United States Patent
Li et al.

(10) Patent No.: US 11,310,353 B2
(45) Date of Patent: Apr. 19, 2022

(54) DATA TRANSMISSION METHOD FOR CREATING DATA STRUCTURE FACILITATING DATA TRANSMISSION AND RECEPTION

(71) Applicant: Shenzhen Jingjiang Yunchuang Technology Co., Ltd., Shenzhen (CN)

(72) Inventors: Jun-Qi Li, Shenzhen (CN); Juka Oh, Shenzhen (CN); Qing Liu, Shenzhen (CN); Xue-Qin Zhang, Shenzhen (CN); Shang-Hua Hao, Shenzhen (CN)

(73) Assignee: Shenzhen Jingjiang Yunchuang Technology Co., Ltd., Shenzhen (CN)

( * ) Notice: Subject to any disclaimer, the term of this patent is extended or adjusted under 35 U.S.C. 154(b) by 213 days.

(21) Appl. No.: 16/747,762

(22) Filed: Jan. 21, 2020

(65) Prior Publication Data
US 2021/0067613 A1    Mar. 4, 2021

(30) Foreign Application Priority Data
Aug. 30, 2019  (CN) .......................... 201910817690.2

(51) Int. Cl.
*H04L 69/324*    (2022.01)
*H04L 12/66*    (2006.01)
*H04L 67/12*    (2022.01)

(52) U.S. Cl.
CPC ............ *H04L 69/324* (2013.01); *H04L 12/66* (2013.01); *H04L 67/12* (2013.01); *H04L 2212/00* (2013.01)

(58) Field of Classification Search
CPC ....... H04L 69/324; H04L 12/66; H04L 67/12; H04L 2212/00; H04L 69/22; G06F 16/22
See application file for complete search history.

(56) References Cited

U.S. PATENT DOCUMENTS

| 7,197,046 | B1 * | 3/2007 | Hariharasubrahmanian ............... H04L 69/22 370/466 |
| 2008/0259902 | A1 * | 10/2008 | Park ........................ H04L 69/04 370/349 |

(Continued)

FOREIGN PATENT DOCUMENTS

| CN | 112637223 A | * | 4/2021 |
| JP | 201176129 A | * | 9/2009 |

(Continued)

OTHER PUBLICATIONS

Makoto Mizutani,the TCP / IP protocol hierarchy and communication model,online,Japan, Meiji University,Jan. 23, 2016,pp. 1-25.

(Continued)

*Primary Examiner* — Tejis Daya
(74) *Attorney, Agent, or Firm* — ScienBiziP, P.C.

(57) ABSTRACT

A method for structuring transmissible data of various types with universal applicability as between devices of various types includes a data content, a first data header, and a second data header. The first data header signifies numerical data or control/command data. The second data header is a description of a data group to which the collected data belongs. The data further can include a third data header configured to describe production process information of the data. The data further can include a fourth data header to describe a product type, an industrial field, a company name, and a company address.

7 Claims, 5 Drawing Sheets

| Data header 3 | Data header 2 | Data header 1 | Data header 0 | Data content |

(56) References Cited

U.S. PATENT DOCUMENTS

| | | | | |
|---|---|---|---|---|
| 2009/0172035 A1* | 7/2009 | Lessing | ............ | G06Q 30/02 |
| 2009/0240778 A1* | 9/2009 | Forlivesi | ............ | H04L 69/08 |
| | | | | 709/206 |
| 2010/0103878 A1* | 4/2010 | Fujiwara | ............ | H04L 67/12 |
| | | | | 370/328 |
| 2010/0329260 A1* | 12/2010 | Kim | ............ | H04L 45/122 |
| | | | | 370/392 |
| 2011/0022665 A1* | 1/2011 | Pinto | ............ | G06F 13/4247 |
| | | | | 709/206 |
| 2018/0125989 A1 | 5/2018 | DeRosa et al. | | |

FOREIGN PATENT DOCUMENTS

| | | |
|---|---|---|
| JP | 2011076129 A | 4/2011 |
| JP | 2018014028 A | 1/2018 |
| JP | 2019144716 A | 8/2019 |

OTHER PUBLICATIONS

S. Bae, D. Kim, M. Ha and S. H. Kim, "Browsing Architecture with Presentation Metadata for the Internet of Things," 2011 IEEE 17th International Conference on Parallel and Distributed Systems, 2011, pp. 721-728, doi: 10.1109/ICPADS.2011.36.

\* cited by examiner

| Data header 3 | Data header 2 | Data header 1 | Data header 0 | Data content |

FIG. 4

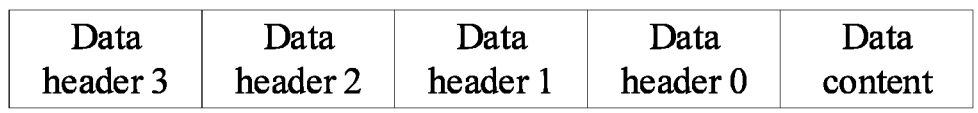

Data is sent or received, the data includes data content, a data header 0 and a data header 1, the data header 0 is a numerical data header or a control data header, the format of the numerical data header 0 includes, but is not limited to, a data ID, a data type, a data name, a data description, ID of a data group to which the data belongs, a data type, a data measurement unit, and a byte length of the data; the format of the control data header 0 includes, but is not limited to, a data ID, a data type, a custom enumeration type , a control command name, a control command function description, a control command, a target device ID, a command interface, and a quantity of command parameters; the format of the data header 1 includes, but is not limited to, a device ID, a device type, a device name, and a device function

FIG. 5

| Data header 1 | Data header 0 | Data content |
|---|---|---|

FIG. 6

| Data header 2 | Data header 1 | Data header 0 | Data content |
|---|---|---|---|

FIG. 7

| Data header 3 | Data header 1 | Data header 0 | Data content |
|---|---|---|---|

FIG. 8

DATA TRANSMISSION METHOD FOR CREATING DATA STRUCTURE FACILITATING DATA TRANSMISSION AND RECEPTION

FIELD

The subject matter herein generally relates to communications, and more particularly to a data transmission method.

BACKGROUND

The Internet of Things and the Industrial Internet involves interactions between devices and devices, devices and sensors, sensors and sensors, devices and instruments, and devices and cloud networks. To enable such interworking, transmissible data should be robust and universally transmissible.

BRIEF DESCRIPTION OF THE DRAWINGS

Implementations of the present disclosure will now be described, by way of embodiments, with reference to the attached figures.

FIG. 4 is a schematic diagram of a structured data according to a first embodiment of the preset disclosure.

FIG. 5 is a flowchart of a data transmission method according to another embodiment of the present disclosure.

FIG. 6 is a schematic diagram of a structured data according to a second embodiment of the preset disclosure.

FIG. 7 is a schematic diagram of a structured data according to a third embodiment of the preset disclosure.

FIG. 8 is a schematic diagram of a structured data according to a fourth embodiment of the preset disclosure.

DETAILED DESCRIPTION

Figure 1:
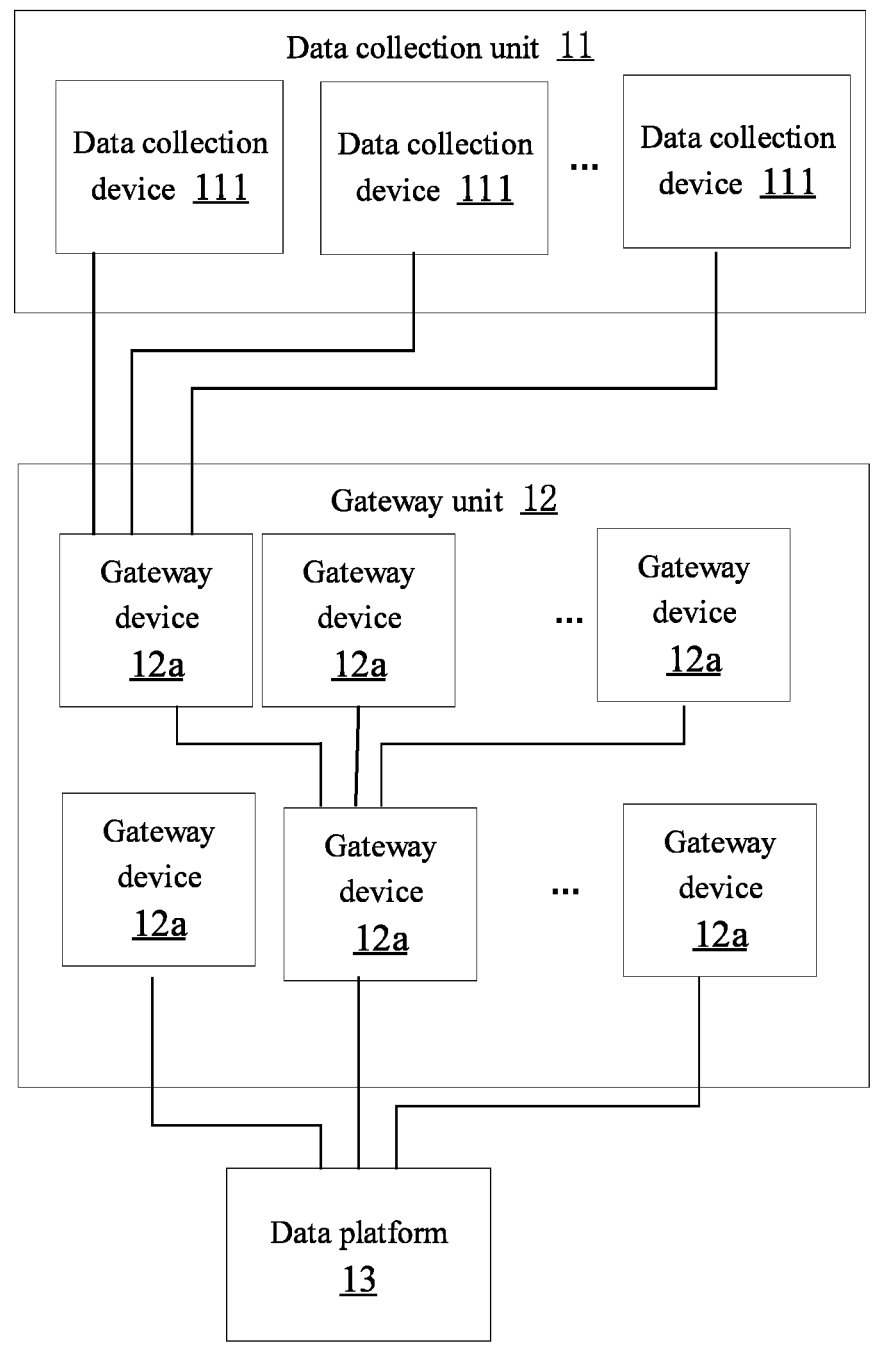
FIG. 1 is a diagram of an application environment of a data transmission method according to an embodiment.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows an embodiment of an application environment of a data transmission method. In the embodiment, the data transmission method is applied in a communication system 100. The communication system 100 includes, but is not limited to, a data collection unit 11, a gateway unit 12, and a data platform 13. In the embodiment, the communication system 100 can be, but is not limited to, a communication system in the Internet of Things, for example, an industrial Internet of Things, an agricultural Internet of Things, a fishery Internet of Things, a mining Internet of Things, a traffic management system, a smart city system, and the like.

In the embodiment, the data collection unit 11 includes different types of data collection devices 111. The data collection devices 111 can include different types of devices for collecting data. For example, the data collection devices 111 can include different types of sensors, instruments, radio frequency tags, Programmable Logic Controllers, and the like. The data collection devices 111 further can include Supervisory Control And Data Acquisition (SCADA) systems. The data collection unit 11 collects data from various data sources. For example, for the industrial Internet, the data source may be an industrial production resource, such as raw materials, production equipment, a production environment, or the like. The data source also can be a business-related management system, such as an enterprise information system. The data collected by the data collection unit 11 may include various types of data, for example, the data can be, but not limited to, operating parameter data, operating condition status parameters, and environmental parameter data of a device.

The gateway unit 12 is configured to establish a communication between the data collection unit 11 and the data platform 13. The gateway unit 12 includes multiple layers, each of the layers includes multiple gateway devices 12a. The gateway devices 12a in a first layer of the gateway unit 12 are connected to the data collection unit 11. Each gateway device 12a in a next layer connects to at least one gateway device 12a in a current layer. For example, as shown in FIG. 1, the gateway unit 12 includes a first layer and a second layer. Each gateway device 12a in the first layer is connected to the data collection unit 11. Multiple gateway devices 12a in the first layer are connected to one of the gateway devices 12a in the second layer, and all the gateway devices 12a in the second layer are connected to the data platform 13.

The data collected by the data collection unit 11 is structured according to a preset rule when the data is transmitted to the data platform through the gateway unit 12. The structured data is aggregated in the data platform 13 and can be used for data transactions, data exchanges, data sharing, product information follow-up, and the like.

By using a data structure method, the format of various types of data in the Internet of Things can be unified, and the structured data can be automatically identified and analyzed. Thereby, communications between devices and devices, devices and sensors, sensors and sensors, devices and instruments in the Internet of Things, devices and cloud devices are realized. Furthermore, through the interconnection of data, automatic identification and analysis of various data in a wide range of industries such as industry, agriculture, fishery, mining, light industry, traffic management, and smart cities can be achieved, and various industries can be developed.

Figure 2:
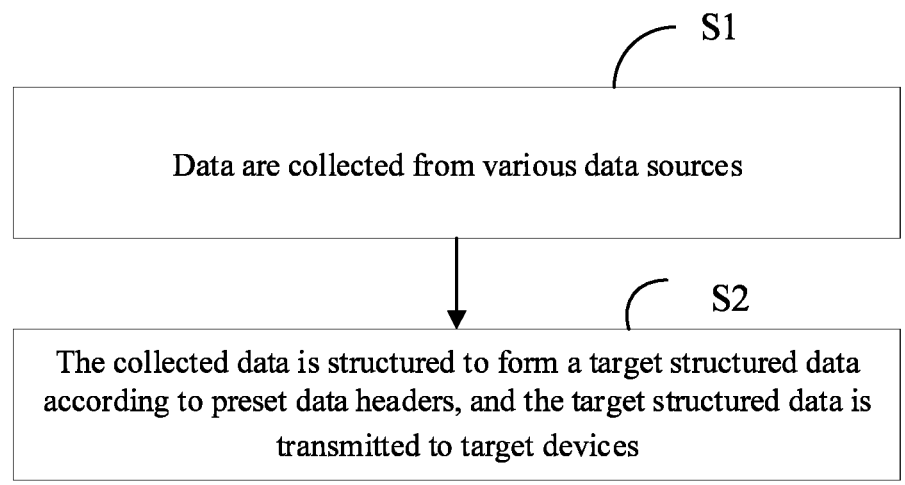
FIG. 2 is a flowchart of an embodiment of a data transmission method.

FIG. 2 shows a flowchart of an embodiment of a data transmission method. The method is provided by way of embodiment, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure.

At block S1, data are collected from various data sources.

In this embodiment, data can be collected by at least one data collection unit such as a management system platform, sensors, equipment, instruments, and equipment.

In this embodiment, the data can be any type of numerical data or other data.

Numerical data relate to numbers, such as a temperature value collected by a temperature sensor, an ambient humidity value collected by a humidity sensor, or the like.

The other data can include control data, where control data are data that can control or command other devices, for example, the control data can be control commands that control other platforms, sensors, instruments, and equipment. Such control data can include, but not limited to, control parameters, ID of target devices, and interfaces of the target devices.

In at least one embodiment, because the collected data can include incomplete data, duplicate data, default data, redundant data, and other sub-optimal data, an analysis based on the collected data will produce incorrect results. Therefore, the collected data needs to be cleaned to avoid such incorrect results. Therefore, the method further includes cleaning the collected data.

In one embodiment, the method for cleaning the collected data includes:

removing redundancy, fragmentation, and noise from the collected data according to a preset cleaning rule algorithm. In one embodiment, the preset cleaning rule algorithm can be a missing value removal method, a mean filling method, or a hot card filling method. In one embodiment, the removing of missing values is to directly drop samples with missing values from the data. The mean filling method is to divide the data into groups according to a property correlation coefficient of the missing value in the data, calculate a mean value of each group, and insert the mean as the missing value. The hot card filling method is to find an object in a database that has a value similar to the missing value and then fill the value of the object into the missing value.

In at least one embodiment, the method further includes determining whether the collected data is compliant with a standard. In detail, the method for determining whether the collected data is compliant includes setting different compliance rules for the data collected and determining whether the data is compliant according to the corresponding compliance rule. In one embodiment, the compliance rule includes determining whether the numerical range of the data is in a preset range or determining whether the length of the data is within a preset length. Compliant data is thus determined when the numerical range of the data is in the preset range and the length of the data is in a preset length. In one embodiment, the data will be discarded when the data is not in compliance.

At block S2, the collected data is first structured to form a target structured data according to preset data headers, and the target structured data is then transmitted to target devices, for example the data platform. The method for structuring the collected data to form a target structure data will be described below with reference to FIGS. 3 and 4.

Figure 3:
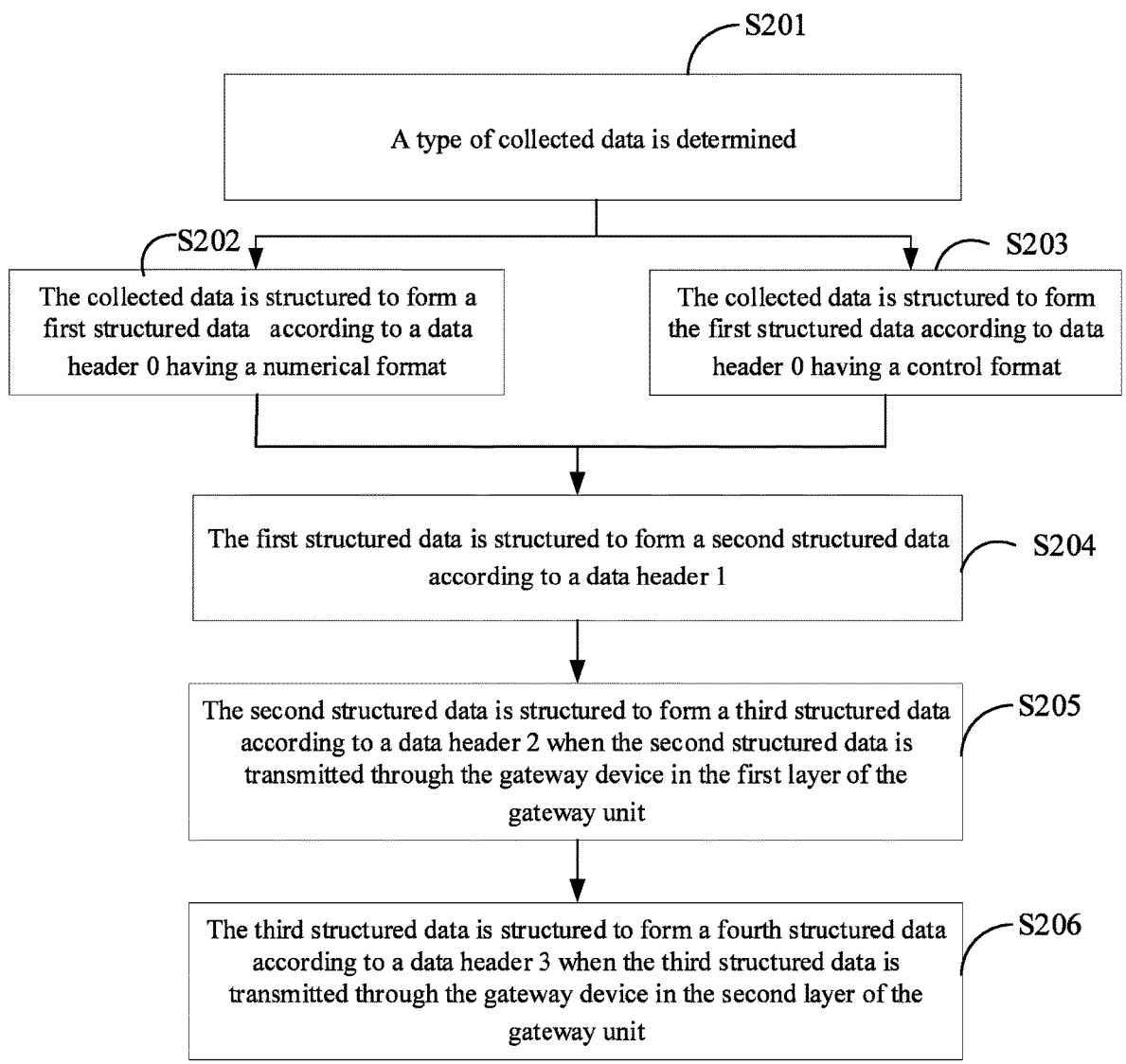
FIG. 3 is a flowchart of an embodiment of a data structuring method.

FIG. 3 shows a flowchart of an embodiment of a data structuring method.

At block S201, a type of collected data is determined, the type of the collected data can be a numerical data or control data. When the collected data are numerical data, step S202 is performed, and when the collected data are control data, step S203 is performed.

At block S202, the collected data is structured to form a first structured data according to a data header 0 having a numerical format (hereinafter "numerical data header 0").

In one embodiment, the format of the numerical data header 0 includes, but is not limited to, a data ID, a data type, a data name, a data description, ID of a data group to which the data belongs, a data type (numeric), a data measurement unit, and a byte length of the data.

The data ID is a unique identifier of the data, the ID of the data group to which the data belongs is the unique identifier of said data group. One data group may include one or more collected data.

In at least one embodiment, the format of the numerical data header 0 further includes: an upper limit value of the data, a lower limit value of the data, a center value of the data, a missing identity of the data, and a default access property of the data, data generation time, and custom attributes. In one embodiment, in the default access property of the data, R indicates read-only, W indicates write-only, and RW indicates read & write.

For example, after a humidity sensor numbered "20190828Tsensor" collects one data set or multiple data sets within one day, the collected data is structured according to the numerical data header 0. After the collected data is structured according to the data header 0, attributes are added to the collected data. Such attributes can include the data ID, the data type, the data name, the data description, the ID of the data group to which the collected data belongs, the data type (numeric), the measurement unit of the data, the byte length of data, and other attributes corresponding to the humidity sensor.

In this embodiment, for sets of data collected by a same device, the content of the attributes in the numerical data header 0 may be the same or different according to different attributes of the data. For example, if the numerical data header 0 is used to describe a temperature of a certain area collected by a temperature sensor, the upper limit value and lower limit value of the temperature in the day may be different from the upper limit value and lower limit value of the temperature at night. Thus, the upper limit value of the data in the numerical data header 0 used in the daytime may be different from the upper limit value of the data in the corresponding numerical data header 0 used at nighttime.

At block S203, the collected data is structured to form the first structured data according to data header 0 having a control format (hereinafter "control data header 0).

The format of the control data header 0 includes, but is not limited to, a data ID, a data type, a custom enumeration type (command type), a control command name, a control command function description, a control command, a target device ID, a command interface, and a quantity of command parameters. For example, the quantity of the command parameters can be n, and the command parameters include a command parameter 1, a command parameter 2, to command parameter n, where n is a positive integer that is more than one.

At block S204, the first structured data set is structured to form a second structured data set according to a data header 1.

In one embodiment, the format of the data header 1 includes, but is not limited to, a device ID, a device type, a device name, and a device function. The data header 1 is configured to describe a data group to which the collected data set belongs, the data group includes multiple sets of data.

The data header 1 is added to the first structured data set before the first structured data set is transmitted through the gateway devices 12a in the first layer of the gateway unit 12. The data header 1 added to all first structured data sets generated by a single device, and the data header 1 is used to indicate the information of the device that generates the collected data set in the first structured data set.

In some implementations, the target structured data set may include only the collected data set, the data header 0, and the data header 1. The data header 0 is a description of the collected data set, and the data header 1 is a description of a data group to which the collected data set belongs, for example, the data collected from a single device belongs to a same data group.

In other embodiments, the target structured data set may include the collected data set, the data header 0, the data header 1, and other data headers. After structuring the collected data set according to the data header 0 and the data header 1 to form the second structured data set, a new header is added to the second structured data set when the second structured data set is transmitted through each layer of the gateway unit 12. For example, when the second structured data set is transmitted by the gateway device in the first layer of the gateway unit, a new data header is added to form a new structured data set, and when the new structured data set is transmitted by the gateway device in the second layer of the gateway unit, another data header is added. For example, before the data collected by different devices in a single workshop are aggregated to a general gateway device of a company, a data header describing the information of the single workshop is added to form a new structured data set. Before all the data of the company is transmitted to the data platform through the general gateway, another data header describing the company is added, which may include, for example, industry type, industry field, company name, company address, and so on. Therefore, the method further includes the following blocks.

At block 205, the second structured data set is structured to form a third structured data set according to a data header 2 when the second structured data set is transmitted through the gateway device in the first layer of the gateway unit. The data header 2 is used to describe production process information.

In a first embodiment, the data header 2 includes a product name, a project name, a process number, and a production line number.

In a second embodiment, the data header 2 includes a project name, a department name, a process name, and a process number.

In a third embodiment, the data header 2 includes a project name, a department name, a product name, and a product number.

In a fourth embodiment, the data header 2 includes a product number, a project, a department, and a production line number.

In a fifth embodiment, the data header 2 includes at least one of a product name, a project name and a department name, and at least a process name or a process number.

Before the data generated by different devices in a single plant or area, a single workshop, or a single department are sent to the gateway device in a next layer of the gateway unit through the gateway device in the first layer of the gateway unit, the data set is structured according to the data header 2 to describe the product name, the project name, the process information, and the production line information corresponding to the data set.

For example, for a mobile phone factory, the processing of the mobile phone model "ABCMate20" may include the following steps: shell processing, electronic component assembly testing, and product packaging. The shell processing data, electronic component assembly testing data, and packaging data can be respectively obtained through shell processing equipment, assembly test equipment, and product packaging equipment. After the data obtained by each device are encapsulated by the addition of the data header 0 and the data header 1, the data header 2 indicating the information as to process or stage of process is also added to the encapsulated data. For example, the data header 2 added to the shell processing data is "ABCMate20_shell processing_production line 5". The data header 2 added to the electronic component assembly testing data is "ABCMate20 electronic component assembly test_production line 2", and the data header 2 added to the packaging data is "ABCMate20_package_production line 1".

In at least one embodiment, the method further includes:

Step S206: the third structured data set is structured to form a fourth structured data set according to a data header 3 when the third structured data set is transmitted through the gateway device in the second layer of the gateway unit. The data header 3 includes, but is not limited to, a product type, an industrial field, a company name, and a company address.

As an example, the production data and test data of a metal material company in Shenzhen, China, are considered. The production data and test data encapsulated by adding the data header 0, the data header 1, and the data header 2 forms the third structured data set. When the third structured data set is transmitted through a gateway device in a second layer of the gateway unit, a data header 3 is added to the third structured data set, and the data header 3 may include "metal material name production material company name Shenzhen, China".

After the data are encapsulated by adding the data header 0, the data header 1, the data header 2, and the data header 3, the encapsulated data are sent to a target device, for example a data platform, for data exchange, sharing, and trading. FIG. 4 is a schematic diagram of a structured data set according to an embodiment.

It can be understood that, in some embodiments, after the second structured data set is formed by adding the data header 0 and the data header 1 to the collected data, the data header 3 can be added to the second structured data set without adding the data header 2. In some implementations, the collected data set can be encapsulated by adding the data header 0, the data header 1, and the data header 2, and then sent to the target device without adding the data header 3.

In an embodiment, a first method for structuring the data set includes: adding the description content of the data header before the data, and simultaneously transmitting the data header to the preset target device with the data. In a manner similar to data formatting in traditional communication protocols, a data set structured description content related to the data is also transmitted while transmitting the data. When the structured data set is used, the data content is received and displayed according to the structured description content of the data header. In this way, the amount of data to be transmitted is small, but when using the data, the data need to be parsed according to the data header.

In another embodiment, a second method for structuring the data set includes: converting the data according to the format of the data header, and each data set includes a data structured description attribute, that is, using a database to store and transfer the data and corresponding structured description attributes. When users use the data, they can use it directly according to the structured description of the data set without additional data parsing, but in this way, the data transmission volume is relatively large.

In another embodiment, the first and second methods for structuring the data set may be used in combination.

In the embodiment, Jason or XML is used as a structured description programming language, so that the structured definition and description of data has universality and ease of use.

It can be understood that, in other embodiments, other programming languages can also be used as the structured description language.

FIG. 5 shows a flowchart of a data transmission method according to another embodiment. The method is provided by way of embodiment, as there are a variety of ways to carry out the method. The method described below can be carried out using the configurations illustrated in FIG. 1, for example, and various elements of these figures are referenced in explaining the example method.

At block S501, a data set is sent or received. The data set includes the data content, a data header 0, and a data header 1. The data header 0 is a numerical data header or a control data header. The format of the numerical data header 0 includes, but is not limited to, a data ID, a data set type, a data name, a data description, ID of a data group to which the data set belongs, a data type (numeric), a data measurement unit, and a byte length of the data set. The format of the control data header 0 includes, but is not limited to, a data ID, a data set type, a custom enumeration type (command type), a control command name, a control command function description, a control command, a target device ID, a command interface, and a quantity of command parameters. The format of the data header 1 includes, but is not limited to, a device ID, a device type, a device name, and a device function. In one embodiment, the structure of the data is as shown in FIG. 6.

In another embodiment, see FIG. 7, the data set includes the data content, the data header 0, the data header 1, and a data header 2.

In a first embodiment, the data header 2 includes a product name, a project name, a process number, and a production line number.

In a second embodiment, the data header 2 includes a project name, a department name, a process name, and a process number.

In a third embodiment, the data header 2 includes a project name, a department name, a product name, and a product number.

In a fourth embodiment, the data header 2 includes a product number, a project, a department, and a production line number.

In a fifth embodiment, the data header 2 includes at least a product name, a project name or a department name, and at least a process name or a process number.

In another embodiment, see FIG. 8, the data set includes the data content, the data header 0, the data header 1, and a data header 3. The data header 3 includes, but is not limited to, a product type, an industrial field, a company name, and a company address.

In another embodiment, as shown in FIG. 4, the data set includes the data content, the data header 0, the data header 1, the data header 2, and a data header 3.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. A data transmission method comprising:
structuring collected data to form a target structured data according to preset data headers; and
transmitting the target structured data to a target device;
wherein a method of structuring the collected data according to the preset data header comprises:
determining a type of the collected data, wherein
if the collected data is determined to be numerical data, structuring the collected data to form a first structured data according to a first data header, wherein the first data header comprises a data identification (data ID), a data type, a data name, a data description, an identification (ID) of a data group to which the data belongs, a data measurement unit, and a byte length of the data, and
if the collected data is determined to be a control data, structuring the collected data to form the first structured data according to a second data header, wherein the second data header comprises: a data identification (data ID), a data type, a custom enumeration type, a control command name, a control command function description, a control command, a target device identification (ID), a command interface, and a quantity of command parameters;
structuring the first structured data according to a third data header to form a second structured data, wherein the third data header comprises: a device identification (ID), a device type, a device name, and a device function.

2. The data transmission method of claim 1, wherein the method of structuring the collected data according to the preset data further comprising:
structuring the second structured data according to a fourth data header to form a third structured data, wherein the fourth data header comprises production process information.

3. The data transmission method of claim 2, wherein the fourth data header is selected from a group consisting of:
- a product name, a project name, a process number, and a production line number;
- a project name, a department name, a process name, and a process number;
- a project name, a department name, a product name, and a product number;
- a product number, a project, a department, and a production line number; and
- a product name, a project name and a department name, and at least one of a process name and a process number.

4. The data transmission method of claim 1, wherein the method of structuring the collected data set further comprising:
- structuring the second structured data according to a fifth data header to form a fourth structured data, wherein the fifth data header comprises a product type, an industrial field, a company name, and a company address.

5. The data transmission method of claim 3, further comprising:
- structuring the third structured data according to a fifth data header to form a fifth structured data, wherein the fifth data header comprises a product type, an industrial field, a company name, and a company address.

6. A data transmission method for transmitting data, comprising:
- sending or receiving a data, wherein the data comprises data content, a first data header, a second data header, and a fourth data header;
- wherein the first data header is a numerical data header or a control data header,
- wherein a format of the numerical data header comprises a data identification (data ID), a data type, a data name, a data description, identification (ID) of a data group to which the data belongs, a data measurement unit, and a byte length of the data,
- wherein the control data header comprises a data identification (data ID), a data type, a custom enumeration type, a control command name, a control command function description, a control command, a target device identification (ID), a command interface, and a quantity of command parameters;
- wherein the second data header comprises a device identification (device ID), a device type, a device name, and a device function;
- wherein the fourth data header comprises a product type, an industrial field, a company name, and a company address.

7. The data transmission method of claim 6, wherein the data further comprises a third data header, the third data header is selected from a group consisting of:
- a product name, a project name, a process number, and a production line number;
- a project name, a department name, a process name, and a process number;
- a project name, a department name, a product name, and a product number;
- a product number, a project, a department name, and a production line number; and
- a product name, a project name and a department name, and at least a process name or a process number.

* * * * *